(12) United States Patent
Prokschi et al.

(10) Patent No.: US 10,179,851 B2
(45) Date of Patent: Jan. 15, 2019

(54) ONE-STEP PRODUCTION OF A POLYPROPYLENE COMPOSITION

(71) Applicant: Borealis AG, Vienna (AT)

(72) Inventors: Hermann Prokschi, Wartberg ob der Aist (AT); Katja Klimke, Abu Dhabi (AE); Hermann Braun, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/893,590

(22) PCT Filed: May 16, 2014

(86) PCT No.: PCT/EP2014/060115
§ 371 (c)(1),
(2) Date: Nov. 24, 2015

(87) PCT Pub. No.: WO2014/195114
PCT Pub. Date: Dec. 11, 2014

(65) Prior Publication Data
US 2016/0108220 A1    Apr. 21, 2016

(30) Foreign Application Priority Data
Jun. 5, 2013 (EP) .................................. 13170587

(51) Int. Cl.
C08L 23/00     (2006.01)
C08L 23/12     (2006.01)
C08F 255/02    (2006.01)
C08J 5/18      (2006.01)

(52) U.S. Cl.
CPC ............ *C08L 23/12* (2013.01); *C08F 255/02* (2013.01); *C08J 5/18* (2013.01); *C08J 2323/12* (2013.01); *C08J 2423/12* (2013.01); *C08L 2203/16* (2013.01); *C08L 2205/025* (2013.01)

(58) Field of Classification Search
CPC .................................. C08L 23/12; C08L 23/10
See application file for complete search history.

(56) References Cited

U.S. PATENT DOCUMENTS

| | | | | |
|---|---|---|---|---|
| 8,552,116 B2* | 10/2013 | Okura | ................... | C08J 9/0014 525/193 |
| 9,290,600 B2* | 3/2016 | Prokschi | ............... | C08F 255/02 |
| 9,376,549 B2* | 6/2016 | Klimke | ................... | C08K 5/52 |
| 2003/0032731 A1 | 2/2003 | Oswald et al. | | |
| 2005/0154136 A1* | 7/2005 | Dharia | ..................... | C08F 8/00 525/192 |
| 2008/0255261 A1* | 10/2008 | Motha | ..................... | C08J 9/0061 521/139 |
| 2010/0047544 A1* | 2/2010 | Busch | ........................ | C08J 5/18 428/220 |
| 2011/0111243 A1* | 5/2011 | Laiho | ..................... | B32B 27/10 428/486 |
| 2014/0308502 A1* | 10/2014 | Farah | ..................... | B29C 51/10 428/220 |
| 2015/0133590 A1* | 5/2015 | Klimke | ................ | C08F 210/06 524/151 |
| 2015/0175789 A1* | 6/2015 | Klimke | ................ | C08F 110/06 252/500 |

FOREIGN PATENT DOCUMENTS

| | | | |
|---|---|---|---|
| EP | 0 890 612 A2 | | 1/1991 |
| EP | 0 787 750 A2 | | 8/1997 |
| EP | 0 879 830 A1 | | 11/1998 |
| EP | 1059332 A1 | | 12/2000 |
| EP | 1 892 264 A1 | | 2/2008 |
| EP | 1900764 A1 | | 3/2008 |
| EP | 2000504 A1 | | 12/2008 |
| EP | 2113541 A1 | | 11/2009 |
| EP | 2386584 | * | 11/2011 |
| EP | 2 520 425 A1 | | 11/2012 |
| EP | 2520425 | * | 11/2012 |
| EP | 2810961 B1 | | 4/2016 |
| JP | H02308839 A | | 12/1990 |
| JP | H06122792 A | | 5/1994 |
| JP | 2003502468 A | | 1/2003 |
| KR | 20120088653 A | | 8/2012 |
| WO | 02051890 A1 | | 7/2002 |
| WO | 2008022804 A1 | | 2/2008 |
| WO | 2009133016 A1 | | 5/2009 |
| WO | 2011046103 A1 | | 4/2011 |
| WO | 2014/016206 A1 | | 1/2014 |

OTHER PUBLICATIONS

McCallum et al, Polym. Eng. Sci., 47, 1133-1140, 2007.*
International Search Report for International Application No. PCT/EP2014/060115, dated Aug. 6, 2014.
Pasquini, N., Ed., Polypropylene Handbook, 2nd Edition, Hanser (2005), pp. 405-415.
Wagner, M.H., Schulze, V. and Gottfert, A., "Rheotens-Mastercurves and Drawability of Polymer Melts", Polymer Engineering and Science, vol. 36 (1996), pp. 925-935.
Extended European Search Report for Application No. EP 13 17 0587, dated Nov. 13, 2013.

* cited by examiner

*Primary Examiner* — Irina Krylova
(74) *Attorney, Agent, or Firm* — Warn Partners, P.C.

(57) ABSTRACT

The present invention relates to a process for providing a polypropylene composition comprising a branched polypropylene (b-PP), a polypropylene composition as well as a film comprising the polypropylene composition.

18 Claims, No Drawings

ONE-STEP PRODUCTION OF A POLYPROPYLENE COMPOSITION

CROSS REFERENCE TO RELATED APPLICATIONS

This application is a National Stage of International Application No. PCT/EP2014/060115, filed May 16, 2014. This application claims priority to European Patent Application No. EP13170587.3 filed on Jun. 5, 2013. The disclosures of the above applications are incorporated herein by reference.

The present invention relates to a process for providing a polypropylene composition comprising a branched polypropylene (b-PP), a polypropylene composition as well as a film comprising the polypropylene composition.

High melt strength polypropylene (HMS-PP) compositions are generally known in the art. EP 0 879 830, filed by Borealis in 1997, describes the basics of the Borealis high melt strength (HMS) post-reactor process where peroxide and butadiene are used to make long chain branched polypropylene (LCB-PP) materials. This patent covers a wide range of powder melt flow rates (MFRs) and particle sizes.

One of the biggest challenges within the existing commercially available high melt strength polypropylene (HMS-PP) compositions based HMS extrusion coating grades, such as the WF420HMS grade, is their rather high time- and cost-consuming production together with varying film quality. This is because the commercially available coating grades are typically produced in a two-step process. In a first step, a polypropylene composition is prepared in a HMS line and in a second step, the obtained product is then vis-broken to increase the melt flow rate (MFRs). The increase of melt flow rate (MFRs) is required to decrease the OCS gel index and to obtain a suitable MFR for extrusion coating.

There remains a need in the art for a less time- and cost-consuming process to produce polypropylene compositions, like high melt strength polypropylene (HMS-PP), of reliable and/or improved properties.

Accordingly, the object of the present invention is to provide a process which enables a skilled person to produce a polypropylene composition and a film made of said polypropylene composition having better film quality in a cost- and time-efficient way compared to the respective commercially available coating grade.

The present inventors now surprisingly found out that a polypropylene composition having specific properties such as a desired melt flow rate $MFR_2$ (230° C.) at high $F_{30}$ melt strength and $v_{30}$ melt extensibility, can be produced in a single step process without implementing a subsequent vis-breaking step. Furthermore, it was found that the obtained polypropylene composition and films made therefrom provide better film qualities expressed by a low OCS gel index compared to the respective commercially available coating grade.

Thus, the present invention relates to a process for providing a polypropylene composition comprising a branched polypropylene (b-PP), the process comprises the steps of:
a) providing a polypropylene (PP) having a melt flow rate $MFR_2$ (230° C.) of more than 1.0 g/10 min;
b) providing a thermally decomposing free radical-forming agent,
c) providing bifunctionally unsaturated monomer(s) and/or multifunctionally unsaturated low molecular weight polymer(s),
d) providing a linear polypropylene (l-PP) having a melt flow rate $MFR_2$ (230° C.) of 10.0 to 50.0 g/10 min,
e) reacting the polypropylene (PP) of step a) with the thermally decomposing free radical-forming agent of step b) and the bifunctionally unsaturated monomer(s) and/or multifunctionally unsaturated low molecular weight polymer(s) of step c) obtaining thereby the branched polypropylene (b-PP), and
f) reacting the branched polypropylene (b-PP) obtained in step e) with the linear polypropylene (l-PP) of step d), wherein the polypropylene composition and/or branched polypropylene (b-PP) has/have
i) a melt flow rate $MFR_2$ (230° C.) measured according to ISO 1133 of 18.0 to 35.0 g/10 min,
ii) a $F_{30}$ melt strength of more than 3.4 cN and a $v_{30}$ melt extensibility of more than 200 mm/s, wherein the $F_{30}$ melt strength and the $v_{30}$ melt extensibility are measured according to ISO 16790:2005.

The present invention further provides a polypropylene composition comprising
(a) 95.0 to 99.0 parts by weight of a branched polypropylene (b-PP); and
(b) 1.0 to 5.0 parts by weight of a linear polypropylene (l-PP) having a melt flow rate $MFR_2$ (230° C.) measured according to ISO 1133 of 10.0 to 50.0 g/10 min, preferably from 20.0 to 40.0 g/10 min;
wherein the polypropylene composition has
a melt flow rate $MFR_2$ (230° C.) measured according to ISO 1133 from 18.0 to 35.0 g/10 min, and
an OCS gel index of less than 2,500; and
wherein the polypropylene composition and/or the branched polypropylene (b-PP) has/have a $F_{30}$ melt strength of more than 3.4 cN and a $v_{30}$ melt extensibility of more than 200 mm/s, wherein the $F_{30}$ melt strength and the $v_{30}$ melt extensibility are measured according to ISO 16790:2005.

It is preferred that the polypropylene composition comprises
(a) 95.0 to 99.0 parts by weight of a branched polypropylene (b-PP); and
(b) 1.0 to 5.0 parts by weight of a linear polypropylene (l-PP) having a melt flow rate $MFR_2$ (230° C.) measured according to ISO 1133 from 25.0 to 38.0 g/10 min;
wherein the polypropylene composition has
a melt flow rate $MFR_2$ (230° C.) measured according to ISO 1133 from 19.0 to 25.0 g/10 min, and
an OCS gel index of less than 2,000;
and wherein further the polypropylene composition and/or the branched polypropylene (b-PP) has/have a $F_{30}$ melt strength from 4.0 to 20.0 cN and a $v_{30}$ melt extensibility from 240 to 300 mm/s, wherein the $F_{30}$ melt strength and the $v_{30}$ melt extensibility are measured according to ISO 16790:2005.

It is further preferred that the polypropylene composition comprises at least one additive (A) selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

The present invention still further provides a film comprising the polypropylene composition.

According to one embodiment of the present invention, the polypropylene (PP) has a melt flow rate $MFR_2$ (230° C.) measured according to ISO 1133 in the range from 1.0 to 18.0 g/10 min and preferably in the range from 1.0 to 15.0 g/10 min.

According to another embodiment of the present invention, the polypropylene (PP) (a) is a linear polypropylene (l-PP'); and/or (b) is a linear polypropylene (l-PP') having a $F_{30}$ melt strength of more than 1.0 cN and a $v_{30}$ melt extensibility of below 200 mm/s, wherein the $F_{30}$ melt strength and the $v_{30}$ melt extensibility are measured according to ISO 16790:2005.

According to yet another embodiment of the present invention, (a) the thermally decomposing free radical-forming agent of step b) is a peroxide and/or (b) the bifunctionally unsaturated monomer(s) and/or multifunctionally unsaturated low molecular weight polymer(s) of step c) is/are selected from the group consisting of divinyl compounds, allyl compounds and dienes.

According to one embodiment of the present invention, (a) the linear polypropylene (l-PP) of step d) has a melt flow rate $MFR_2$ (230° C.) measured according to ISO 1133 from 20.0 to 40.0 g/10 min and preferably from 25.0 to 38.0 g/10 min, and/or (b) the linear polypropylene (l-PP) of step d) comprises at least one additive (A), preferably two additives (A), selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof, and/or (c) the branched polypropylene (b-PP) obtained in step e) is free of additives (A).

According to another embodiment of the present invention, steps e) and f) are accomplished in an extruder, said extruder comprises in operation direction a first mixing zone (MZ1) and a second mixing zone (MZ2), wherein further step e) takes place in the first mixing zone (MZ1) whereas step f) takes place in the second mixing zone (MZ2).

According to yet another embodiment of the present invention, the extruder comprises in operation direction a feed-throat (FT), the first mixing zone (MZ1), the second mixing zone (MZ2) and a die (D), wherein between the first mixing zone (MZ1) and the second mixing zone (MZ2) a side feed-throat (SFT) is located, wherein further the polypropylene (PP) of step a), the thermally decomposing free radical-forming agent of step b), and the bifunctionally unsaturated monomer(s) and/or multifunctionally unsaturated low molecular weight polymer(s) of step c) are fed via the feed-throat (FT) and the linear polypropylene (l-PP) of step d) is fed via the side feed-throat (SFT).

According to one embodiment of the present invention, not more than 10.0 wt.-% of the total amount of the branched polypropylene (b-PP) of the polypropylene composition is produced in the second mixing zone (MZ2).

According to another embodiment of the present invention, 1.0 to 6.0 parts by weight of the linear polypropylene (l-PP) are added to 94.0 to 99.0 parts by weight of branched polypropylene (b-PP), preferably wherein 1.0 to 3.0 parts by weight of the linear polypropylene (l-PP) are added to 97.0 to 99.0 parts by weight of branched polypropylene (b-PP), more preferably wherein 2.0 parts by weight of the linear polypropylene (l-PP) are added to 98.0 parts by weight of branched polypropylene (b-PP).

According to yet another embodiment of the present invention, the resulting polypropylene composition and/or branched polypropylene (b-PP) (a) has/have a melt flow rate $MFR_2$ (230° C.) measured according to ISO 1133 of 19.0 to 30.0 g/10 min, and/or (b) has/have a $F_{30}$ melt strength from 4.0 to 20.0 cN and a $v_{30}$ melt extensibility from 240 to 300 mm/s, wherein the $F_{30}$ melt strength and the $v_{30}$ melt extensibility are measured according to ISO 16790:2005; and/or (c) has/have an OCS gel index of less than 2,500 and preferably of less than 2,000.

According to one embodiment of the present invention, the resulting polypropylene composition is prepared in a single step process.

In the following, the invention is described in more detail.

First the individual components provided in the instant invention, i.e. the branched polypropylene (b-PP), the polypropylene (PP), the thermally decomposing free radical-forming agent, the bifunctionally unsaturated monomer(s) and/or multifunctionally unsaturated low molecular weight polymer(s), the linear polypropylene (l-PP), and the optional additives (A), as well as the polypropylene composition are described. Subsequently process steps e) and f) as well as the inventive film are described in more detail. However any information or any preferred embodiment provided for the individual components or the polypropylene composition is also applicable for the inventive process and film, if reference is made to the individual components and the polypropylene composition, respectively.

The major component for the polypropylene composition to be provided according to the invention is a branched polypropylene (b-PP). A branched polypropylene differs from a linear polypropylene in that the polypropylene backbone covers side chains whereas a non-branched polypropylene, i.e. a linear polypropylene, does not cover side chains. The side chains have significant impact on the rheology of the polypropylene. Accordingly linear polypropylenes and branched polypropylenes can be clearly distinguished by its flow behavior under stress.

Branching can be achieved by using specific catalysts, i.e. specific single-site catalysts, or by chemical modification. Concerning the preparation of a branched polypropylene obtained by the use of a specific catalyst reference is made to EP 1 892 264. With regard to a branched polypropylene obtained by chemical modification it is referred to EP 0 879 830 A1. In such a case the branched polypropylene is also called high melt strength polypropylene. Preferably the branched polypropylene (b-PP) of the instant invention is obtained by chemical modification as described in more detail below and thus is a high melt strength polypropylene (HMS-PP).

Therefore, it is one requirement of the present invention that the branched polypropylene (b-PP), preferably the high melt strength polypropylene (HMS-PP), as the major component of the polypropylene composition has a $F_{30}$ melt strength of more than 3.4 cN and a $v_{30}$ melt extensibility of more than 200 mm/s, wherein the $F_{30}$ melt strength and the $v_{30}$ melt extensibility are measured according to ISO 16790:2005.

For example, the branched polypropylene (b-PP), preferably the high melt strength polypropylene (HMS-PP), as the major component of the polypropylene composition has a $F_{30}$ melt strength from 4.0 to 20.0 cN and a $v_{30}$ melt extensibility from 240 to 300 mm/s. Preferably, the branched polypropylene (b-PP), preferably the high melt strength polypropylene (HMS-PP), as the major component of the polypropylene composition has a $F_{30}$ melt strength from 4.0 to 10.0 cN and a $v_{30}$ melt extensibility from 240 to 300 mm/s. The $F_{30}$ melt strength and the $v_{30}$ melt extensibility are measured according to ISO 16790:2005.

Typically the instant polypropylene composition also has a $F_{30}$ melt strength of more than 3.4 cN and a $v_{30}$ melt extensibility of more than 200 mm/s, preferably has a $F_{30}$ melt strength from 4.0 to 20.0 cN and a $v_{30}$ melt extensibility from 240 to 300 mm/s. For example, the instant polypropylene composition has a $F_{30}$ melt strength from 4.0 to 10.0 cN and a $v_{30}$ melt extensibility from 240 to 300 mm/s. The $F_{30}$ melt strength and the $v_{30}$ melt extensibility are measured according to ISO 16790:2005.

In order to provide a sufficient MFR for extrusion coating, one further requirement of the present invention is that the branched polypropylene (b-PP), preferably the high melt strength polypropylene (HMS-PP), as the major component of the polypropylene composition has a melt flow rate $MFR_2$ (230° C.) measured according to ISO 1133 of 18.0 to 35.0 g/10 min. For example, the branched polypropylene (b-PP), preferably the high melt strength polypropylene (HMS-PP), as the major component of the polypropylene composition has a melt flow rate $MFR_2$ (230° C.) measured according to ISO 1133 of 19.0 to 30.0 g/10 min. Preferably, the branched polypropylene (b-PP), preferably the high melt strength polypropylene (HMS-PP), as the major component of the polypropylene composition has a melt flow rate $MFR_2$ (230° C.) measured according to ISO 1133 of 19.0 to 25.0 g/10 min.

It is thus also preferred that the instant polypropylene composition also has a melt flow rate $MFR_2$ (230° C.) measured according to ISO 1133 of 18.0 to 35.0 g/10 min. For example, the instant polypropylene composition has a melt flow rate $MFR_2$ (230° C.) measured according to ISO 1133 of 19.0 to 30.0 g/10 min. Alternatively, the instant polypropylene composition has a melt flow rate $MFR_2$ (230° C.) measured according to ISO 1133 of 19.0 to 25.0 g/10 min.

It is thus required that the branched polypropylene (b-PP), preferably the high melt strength polypropylene (HMS-PP), as the major component of the polypropylene composition has a) a $F_{30}$ melt strength of more than 3.4 cN and a $v_{30}$ melt extensibility of more than 200 mm/s, wherein the $F_{30}$ melt strength and the $v_{30}$ melt extensibility are measured according to ISO 16790:2005,
and
b) a melt flow rate $MFR_2$ (230° C.) measured according to ISO 1133 of 18.0 to 35.0 g/10 min.

It is preferred that the branched polypropylene (b-PP), preferably the high melt strength polypropylene (HMS-PP), as the major component of the polypropylene composition has a) a $F_{30}$ melt strength from 4.0 to 20.0 cN and a $v_{30}$ melt extensibility from 240 to 300 mm/s, wherein the $F_{30}$ melt strength and the $v_{30}$ melt extensibility are measured according to ISO 16790:2005,
and
b) a melt flow rate $MFR_2$ (230° C.) measured according to ISO 1133 of 19.0 to 30.0 g/10 min.

Alternatively, the branched polypropylene (b-PP), preferably the high melt strength polypropylene (HMS-PP), as the major component of the polypropylene composition has a) a $F_{30}$ melt strength from 4.0 to 10.0 cN and a $v_{30}$ melt extensibility from 240 to 300 mm/s, wherein the $F_{30}$ melt strength and the $v_{30}$ melt extensibility are measured according to ISO 16790:2005,
and
b) a melt flow rate $MFR_2$ (230° C.) measured according to ISO 1133 of 19.0 to 25.0 g/10 min.

Furthermore, it is preferred that said branched polypropylene (b-PP), preferably the high melt strength polypropylene (HMS-PP), has an OCS gel index of less than 2,500. Preferably, the branched polypropylene (b-PP), preferably the high melt strength polypropylene (HMS-PP), has an OCS gel index of less than 2,000. For example, the branched polypropylene (b-PP), preferably the high melt strength polypropylene (HMS-PP), has an OCS gel index from 500 to 2,000.

It is thus also preferred that the instant polypropylene composition also has an OCS gel index of less than 2,500. For example, the instant polypropylene composition has an OCS gel index of less than 2,000. Alternatively, the instant polypropylene composition has an OCS gel index from 500 to 2,000.

Hence, in one specific embodiment, the branched polypropylene (b-PP), preferably the high melt strength polypropylene (HMS-PP), has a) a $F_{30}$ melt strength of more than 3.4 cN and a $v_{30}$ melt extensibility of more than 200 mm/s, preferably a $F_{30}$ melt strength from 4.0 to 20.0 cN and a $v_{30}$ melt extensibility from 240 to 300 mm/s and most preferably a $F_{30}$ melt strength from 4.0 to 10.0 cN and a $v_{30}$ melt extensibility from 240 to 300 mm/s, wherein the $F_{30}$ melt strength and the $v_{30}$ melt extensibility are measured according to ISO 16790:2005,
and
b) a melt flow rate $MFR_2$ (230° C.) measured according to ISO 1133 of 18.0 to 35.0 g/10 min, preferably from 19.0 to 30.0 g/10 min and most preferably from 19.0 to 25.0 g/10 min,
and
c) an OCS gel index of less than 2,500, preferably of less than 2,000 and most preferably from 500 to 2,000.

Accordingly, also the instant polypropylene composition preferably has a) a $F_{30}$ melt strength of more than 3.4 cN and a $v_{30}$ melt extensibility of more than 200 mm/s, preferably a $F_{30}$ melt strength from 4.0 to 20.0 cN and a $v_{30}$ melt extensibility from 240 to 300 mm/s and most preferably a $F_{30}$ melt strength from 4.0 to 10.0 cN and a $v_{30}$ melt extensibility from 240 to 300 mm/s, wherein the $F_{30}$ melt strength and the $v_{30}$ melt extensibility are measured according to ISO 16790:2005,
and
b) a melt flow rate $MFR_2$ (230° C.) measured according to ISO 1133 of 18.0 to 35.0 g/10 min, preferably from 19.0 to 30.0 g/10 min and most preferably from 19.0 to 25.0 g/10 min,
and
c) an OCS gel index of less than 2,500, preferably of less than 2,000 and most preferably from 500 to 2,000.

Preferably, the branched polypropylene (b-PP), preferably the high melt strength polypropylene (HMS-PP), has a melting point of at least 130° C., more preferably of at least 135° C. and most preferably of at least 140° C. The crystallization temperature is preferably at least 120° C.

Further, the branched polypropylene (b-PP), preferably the high melt strength polypropylene (HMS-PP), can be a branched random propylene copolymer (b-R-PP), preferably high melt strength random propylene copolymer (R-HMS-PP), or a branched propylene homopolymer (b-H-PP), preferably a high melt strength propylene homopolymer (H-HMS-PP), the latter being preferred.

For the purpose of the present invention, the expression "propylene homopolymer" refers to a polypropylene that consists substantially, i.e. of at least 97 mol.-%, preferably of at least 98 mol.-%, more preferably of at least 99 mol.-%, most preferably of at least 99.8 mol.-% of propylene units. In a preferred embodiment only propylene units in the propylene homopolymer are detectable.

In case the branched polypropylene (b-PP), preferably the high melt strength polypropylene (HMS-PP), is a branched random propylene copolymer (b-R-PP), preferably a high melt strength random propylene copolymer (R-HMS-PP), it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the branched random propylene copolymer (b-R-PP), preferably the high melt strength random propylene copolymer (R-HMS-PP), comprises, especially consists of, monomers copolymerizable with propylene from the group consisting of ethylene, 1-butene and 1-hexene. More specifically the branched random propylene copolymer (b-R-PP), preferably the high melt strength random propylene copolymer (R-HMS-PP), comprises—apart from propylene—units derivable from ethylene and/or 1-butene. In a preferred embodiment the branched random propylene copolymer (b-R-PP), preferably the high melt strength random propylene copolymer (R-HMS-PP), comprises units derivable from ethylene and propylene only. The comonomer content in the branched random propylene copolymer (b-R-PP), preferably in the high melt strength random propylene copolymer (R-HMS-PP), is preferably in the range of more than 0.2 to 10.0 mol.-%, still more preferably in the range of more than 0.5 to 7.0 mol.-%.

In this regard, it is to mention that the high melt strength polypropylene (HMS-PP) being either a high melt strength propylene homopolymer (H-HMS-PP) or a high melt strength random propylene copolymer (R-HMS-PP) may comprise additionally unsaturated monomers different to the comonomers defined for the high melt strength random propylene copolymer (R-HMS-PP). In other words the high melt strength propylene homopolymer (H-HMS-PP) or the high melt strength random propylene copolymer (R-HMS-PP) may comprise unsaturated monomers introduced by chemical modification, like bifunctionally unsaturated monomer(s) and/or multifunctionally unsaturated low molecular weight polymer(s) as defined in detail below, being different to propylene, ethylene and other $C_4$ to $C_{12}$ α-olefins. Accordingly the definition of homopolymer and copolymer in view of the high melt strength polypropylene (HMS-PP) refers actually to the unmodified polypropylene used to obtain the melt strength polypropylene (HMS-PP) by chemical modification as defined in detail below.

As mentioned, the branched polypropylene (b-PP), when used in the form of a high melt strength polypropylene (HMS-PP) is a chemically modified polypropylene. Accordingly the high melt strength polypropylene (HMS-PP) can be further defined by the way obtained. The high melt strength polypropylene (HMS-PP) is preferably the result of treating an unmodified polypropylene with thermally decomposing radical-forming agents and/or with ionizing radiation. However in such a case a high risk exists that the unmodified polypropylene is degraded, which is detrimental. Thus, it is preferred that the modification is accomplished by the use of bifunctionally unsaturated monomer(s) and/or multifunctionally unsaturated low molecular weight polymer(s) as chemically bound bridging unit(s). A suitable method to obtain a high melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene.

Accordingly in one preferred embodiment the high melt strength polypropylene (HMS-PP) comprises
(a) if it is a high melt strength propylene homopolymer (H-HMS-PP) units derived from
  (i) propylene and
  (ii) bifunctionally unsaturated monomer(s) and/or multifunctionally unsaturated low molecular weight polymer(s), or
(b) if it is a high melt strength random propylene copolymer (R-HMS-PP) units derived from
  (i) propylene
  (ii) ethylene and/or $C_4$ to $C_{10}$ α-olefins, e.g. 1-butene and/or 1-hexene, preferably erthylene, and
  (iii) bifunctionally unsaturated monomer(s) and/or multifunctionally unsaturated low molecular weight polymer(s), The branched polypropylene (b-PP), i.e. the high melt strength polypropylene (HMS-PP), may contain more than one bifunctionally unsaturated monomer and/or multifunctionally unsaturated low molecular weight polymer. Even more preferred the amount of bifunctionally unsaturated monomer(s) and/or multifunctionally unsaturated low molecular weight polymer(s) together in the branched polypropylene (b-PP), i.e. in the high melt strength polypropylene (HMS-PP), is 0.01 to 10.0 wt.-% based on said branched polypropylene (b-PP), i.e. based on said high melt strength polypropylene (HMS-PP).

In a preferred embodiment the branched polypropylene (b-PP), i.e. the high melt strength polypropylene (HMS-PP), is free of additives (A). Accordingly in case the instant polypropylene composition comprises additives (A), these additives (A) are not brought in the polypropylene composition during the manufacture of the branched polypropylene (b-PP), i.e. of the high melt strength polypropylene (HMS-PP).

According to step a) of the instant process a polypropylene (PP) having a melt flow rate $MFR_2$ (230° C.) of more than 1.0 g/10 min is provided.

As mentioned above, the branched polypropylene (b-PP), i.e. the high melt strength polypropylene (HMS-PP), is a modified polypropylene, which is obtained by reacting the polypropylene (PP) with a thermally decomposing free radical-forming agent and with bifunctionally unsaturated monomer(s) and/or with multifunctionally unsaturated low molecular weight polymer(s) as well as a linear polypropylene (l-PP).

Essential aspect of the invention is that a specific unmodified polypropylene (PP) must be used in the present invention for the manufacture of the branched polypropylene (b-PP), i.e. of the high melt strength polypropylene (HMS-PP), and thus for the manufacture of the polypropylene composition comprising the branched polypropylene (b-PP), i.e. comprising the high melt strength polypropylene (HMS-PP). A particular finding is that the polypropylene (PP), preferably a linear polypropylene (l-PP'), must have a rather low molecular weight and thus a rather high melt flow rate. Accordingly, it is required that the polypropylene (PP), preferably the linear polypropylene (l-PP'), has a melt flow rate $MFR_2$ (230° C.) measured according to ISO 1133 of more than 1.0 g/10 min, preferably in the range from 1.0 to 18.0 g/10 min, like in the range from 1.0 to 15.0 g/10 min. For example, the polypropylene (PP), preferably the linear polypropylene (l-PP'), has a melt flow rate $MFR_2$ (230° C.) measured according to ISO 1133 in the range from 1.5 to 15.0 g/10 min, preferably in the range from 2.0 to 15.0 g/10 min, more preferably in the range from 3.0 to 13.0 g/10 min and most preferably in the range from 3.0 to 10.0 g/10 min.

The branched polypropylene (b-PP), i.e. the high melt strength polypropylene (HMS-PP), differs from the polypropylene (PP) which is used for its manufacture that the backbone of the branched polypropylene (b-PP), i.e. of the high melt strength polypropylene (HMS-PP), covers side chains whereas the starting product, i.e. the polypropylene (PP), preferably the linear polypropylene (l-PP'), does not cover or nearby does not cover side chains. The side chains have significant impact on the rheology of the polypropylene. Accordingly, the starting product, i.e. the polypropylene (PP), preferably the linear polypropylene (l-PP'), and the obtained branched polypropylene (b-PP), i.e. the high melt strength polypropylene (HMS-PP), can be clearly distinguished by its flow behavior under stress.

Furthermore, as already mentioned above the polypropylene (PP) is preferably a linear polypropylene (l-PP'). The same considerations apply to the linear polypropylene (l-PP) as discussed in detail below. Accordingly, throughout the instant invention, the term "linear polypropylene" indicates that the linear polypropylene, shows no or nearby no-branching structure. Due to the absence of branches, the linear polypropylenes, i.e. the linear polypropylene (l-PP) and the linear polypropylene (l-PP'), are preferably featured by a low $v_{30}$ melt extensibility and/or a low $F_{30}$ melt strength.

Thus, it is preferred that the polypropylene (PP), preferably the linear polypropylene (l-PP'), has (a) a $F_{30}$ melt strength of more than 1.0 cN, preferably of more than 2.0 cN, more preferably in the range of 1.0 to 65.0 cN, still more preferably in the range of 1.5 to 50.0 cN, yet more preferably in the range of 2.0 to 50.0 cN, still yet more preferably in the range of 2.5 to 50.0 cN like in the range of 2.5 to 30 cN; and (b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s, wherein the $F_{30}$ melt strength and the $v_{30}$ melt extensibility are measured according to ISO 16790:2005.

In other words it is preferred that the polypropylene (PP), preferably the linear polypropylene (l-PP'), has a $F_{30}$ melt strength of more than 1.0 cN and a $v_{30}$ melt extensibility of below 200 mm/s, preferably a $F_{30}$ melt strength of more than 2.0 cN and a $v_{30}$ melt extensibility of below 190 mm/s, more preferably a $F_{30}$ melt strength in the range of 1.0 to 65.0 cN and a $v_{30}$ melt extensibility in the range of 100 to below 200 mm/s, yet more preferably a $F_{30}$ melt strength in the range of 2.0 to 50.0 cN and in the range of 120 to 190 mm/s, still yet more preferably a $F_{30}$ melt strength in the range of 2.5 to 50.0 cN and in the range of 120 to 175 mm/s, like a $F_{30}$ melt strength in the range of 2.5 to 30.0 cN and a $v_{30}$ melt extensibility in the range of 125 to 170 mm/s, wherein the $F_{30}$ melt strength and the $v_{30}$ melt extensibility are measured according to ISO 16790:2005.

Accordingly, in one specific embodiment the polypropylene (PP), preferably the linear polypropylene (l-PP'), has (a) a melt flow rate $MFR_2$ (230° C.) measured according to ISO 1133 of more than 1.0 g/10 min, preferably in the range from 1.0 to 18.0 g/10 min, more preferably in the range from 1.0 to 15.0 g/10 min, still more preferably in the range from 1.5 to 15.0 g/10 min, yet more preferably in the range from 2.0 to 15.0 g/10 min, even more preferably in the range from 3.0 to 13.0 g/10 min and most preferably in the range from 3.0 to 10.0 g/10 min; and (b) a $F_{30}$ melt strength of more than 1.0 cN, preferably of more than 2.0 cN, more preferably in the range of 1.0 to 65.0 cN, still more preferably in the range of 1.5 to 50.0 cN, yet more preferably in the range of 2.0 to 50.0 cN, still yet more preferably in the range of 2.5 to 50.0 cN like in the range of 2.5 to 30 cN; and (c) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s, wherein the $F_{30}$ melt strength and the $v_{30}$ melt extensibility are measured according to ISO 16790:2005.

Therefore, in one specific embodiment the polypropylene (PP) is a linear polypropylene (l-PP') having a melt flow rate $MFR_2$ (230° C.) of more than 1.0 g/10 min, a $F_{30}$ melt strength of more than 1.0 cN and a $v_{30}$ melt extensibility of below 200 mm/s, preferably a melt flow rate $MFR_2$ (230° C.) in the range from 1.0 to 18.0 g/10 min, a $F_{30}$ melt strength of more than 2.0 cN and a $v_{30}$ melt extensibility of below 190 mm/s, more preferably a melt flow rate $MFR_2$ (230° C.) in the range from 1.0 to 15.0 g/10 min, a $F_{30}$ melt strength in the range of 1.0 to 65 cN and a $v_{30}$ melt extensibility in the range of 100 to below 200 mm/s, yet more preferably a melt flow rate $MFR_2$ (230° C.) in the range from 1.5 to 15.0 g/10 min a $F_{30}$ melt strength in the range of 1.5 to 50 cN and in the range of 120 to 190 mm/s, still yet more preferably a melt flow rate $MFR_2$ (230° C.) in the range from 2.0 to 15.0 g/10 min, a $F_{30}$ melt strength in the range of 2.0 to 50 cN and a $v_{30}$ melt extensibility in the range of 120 to 175 mm/s, like a melt flow rate $MFR_2$ (230° C.) in the range from 3.0 to 13.0 g/10 min a $F_{30}$ melt strength in the range of 2.5 to 50 cN and a $v_{30}$ melt extensibility in the range of 120 to 175 mm/s. For example, the polypropylene (PP) is a linear polypropylene (l-PP') having a melt flow rate $MFR_2$ (230° C.) in the range from 3.0 to 10.0 g/10 min a $F_{30}$ melt strength in the range of 2.5 to 30 cN and a $v_{30}$ melt extensibility in the range of 125 to 170 mm/s.

Preferably, the polypropylene (PP), preferably the linear polypropylene (l-PP'), has a melting point of at least 140° C., more preferably of at least 150° C. and still more preferably of at least 158° C. For example, the polypropylene (PP), preferably the linear polypropylene (l-PP'), has a melting point in the range from 140° C. to 180° C., more preferably in the range from 150° C. to 170° C. and most preferably in the range from 158° C. to 165° C.

Additionally or alternatively, it is preferred that the polypropylene (PP), preferably the linear polypropylene (l-PP'), is used in form of particles of specific size. Accordingly it is preferred that the polypropylene (PP), preferably the linear polypropylene (l-PP'), has (a) a particle size distribution $d_{90}$ of below 1,500 μm; more preferably below 1,000 μm, still more preferably in the range of 50 to below 1,000 μm, yet more preferably in the range of 100 to 800 μm, like in the range of 150 to 600 μm;

and/or (b) a particle size distribution $d_{50}$ of below 1,000 μm; more preferably below 800 μm, still more preferably in the range of 30 to below 1,000 μm, yet more preferably in the range of 50 to 600 μm, like in the range of 100 to 500 μm;

and/or (c) a $d_{90}/d_{50}$ ratio of below 1.80, more preferably below 1.75, still more preferably below 1.50, yet more preferably in the range of 1.00 to 1.75, still yet more preferably in the range of 1.10 to 1.50.

The polypropylene (PP), preferably the linear polypropylene (l-PP'), can be produced in a known manner for instance by employing a single-site or a Ziegler Natta catalyst. The polypropylene (PP), preferably the linear polypropylene (l-PP'), is a propylene homopolymer (H-PP'), preferably a linear propylene homopolymer (1-H-PP'), or a propylene copolymer (R-PP'), preferably a linear propylene copolymer (1-R-PP'). For example, the polypropylene (PP), preferably the linear polypropylene (l-PP'), is a propylene homopolymer (H-PP'). Concerning the comonomer content and type of comonomer it is referred to the information provided above for the branched polypropylene (b-PP), especially it is referred to the high melt strength random propylene copolymer (R-HMS-PP). Preferably the polypropylene (PP) is a linear polypropylene (l-PP'). Still more preferably the polypropylene (PP) is a linear propylene homopolymer (1-H-PP'). Accordingly all information provided with regard to melt flow rate $MFR_2$ (230° C.), melting point, $F_{30}$ melt strength, $v_{30}$ melt extensibility, and particle size and particle size distribution, respectively, applies especially for the linear polypropylene (l-PP') and the linear propylene homopolymer (1-H-PP').

In a preferred embodiment the polypropylene (PP), preferably the linear polypropylene (1-PP'), is free of additives (A). Accordingly in case the instant polypropylene composition comprises additives (A), these additives (A) are not brought in the polypropylene composition during the manufacture of the branched polypropylene (b-PP), i.e. of the high melt strength polypropylene (HMS-PP).

According to step b) of the instant process a thermally decomposing free radical-forming agent is provided.

Reaction of the bifunctionally unsaturated monomer(s) and/or multifunctionally unsaturated low molecular weight polymer(s) with the unmodified polypropylene (PP), preferably the linear polypropylene (l-PP'), is performed in the presence of a thermally decomposing free radical-forming agent, like a thermally decomposable peroxide and/or ionizing radiation or microwave radiation.

Peroxides are preferred thermally decomposing free radical-forming agents. More preferably the thermally decomposing free radical-forming agent is selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

According to step c) of the instant process bifunctionally unsaturated monomer(s) and/or multifunctionally unsaturated low molecular weight polymer(s) are provided.

"Bifunctionally unsaturated or multifunctionally unsaturated" as used in the present application means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the unmodified polypropylene.

Reaction of the bifunctionally unsaturated monomer(s) and/or multifunctionally unsaturated low molecular weight polymer(s), preferably having a number average molecular weight $(M_n) \leq 10000$ g/mol, synthesized from one and/or more unsaturated monomers with the polypropylene (PP), preferably the linear polypropylene (l-PP'), may be performed in the presence of the thermally decomposing free radical-forming agent.

In one embodiment, the bifunctionally unsaturated monomer(s) of step c) is/are selected from the group consisting of divinyl compounds, allyl compounds and dienes.

For example, the bifunctionally unsaturated monomers may be divinyl compounds, such as divinylaniline, m-divinylbenzene, p-divinylbenzene, divinylpentane and divinylpropane;

allyl compounds, such as allyl acrylate, allyl methacrylate, allyl methyl maleate and allyl vinyl ether;

dienes, such as 1,3-butadiene, chloroprene, cyclohexadiene, cyclopentadiene, 2,3-dimethylbutadiene, heptadiene, hexadiene, isoprene and 1,4-pentadiene;

aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_n) < 10000$ g/mol may be synthesized from one or more unsaturated monomers.

Examples of such low molecular weight polymers are polybutadienes, especially where the different microstructures in the polymer chain, i.e. 1,4-cis, 1,4-trans and 1,2-(vinyl) are predominantly in the 1,2-(vinyl) configuration copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The branched polypropylene (b-PP), preferably the high melt strength polypropylene (HMS-PP), may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the branched polypropylene (b-PP), preferably the high melt strength polypropylene (HMS-PP), is from 0.01 to 10.0 wt.-%, based on said branched polypropylene (b-PP), preferably the high melt strength polypropylene (HMS-PP).

According to step d) of the instant process a linear polypropylene (l-PP) is provided.

During the preparation of the instant polypropylene composition a linear polypropylene (1-PP) is added. One specific finding of the present invention is that the introduction of the linear polypropylene (l-PP) is decisive for preparing the specific polypropylene composition comprising a branched polypropylene (b-PP) in a single step process, i.e. without a subsequent process step in which the obtained product is further vis-broken to receive a polypropylene composition and/or branched polypropylene (b-PP) having the desired melt flow rate $MFR_2$ (230° C.) measured according to ISO 1133 in the range from 18.0 to 35.0 g/10 min. This linear polypropylene (l-PP) is further preferably used to bring additives (A) in the instant polypropylene composition. It is a further finding of the present invention that especially good results in view of optical properties, i.e. in terms of low OCS gel index, are achieved for the instant polypropylene composition and/or branched polypropylene (b-PP) if the additives (A) are brought in by use of a specific polypropylene carrier. Accordingly in a preferred embodiment the additives (A) are introduced in the instant polypropylene composition in the form of an additive mixture (AM), wherein said additive mixture comprises, preferably consists of, the linear polypropylene (l-PP) and the additives (A).

It is preferred that the linear polypropylene (l-PP) must have a rather low molecular weight and thus a rather high melt flow rate. Accordingly, it is required that the linear polypropylene (l-PP) has a melt flow rate $MFR_2$ (230° C.) measured according to ISO 1133 in the range from 10.0 to 50.0 g/10 min, preferably in the range from 20.0 to 40.0 g/10 min, like in the range from 25.0 to 38.0 g/10 min. For example, the linear polypropylene (l-PP) has a melt flow rate $MFR_2$ (230° C.) measured according to ISO 1133 in the range from 28.0 to 38.0 g/10 min, preferably in the range from 30.0 to 38.0 g/10 min and most preferably in the range from 32.0 to 38.0 g/10 min.

Preferably, the linear polypropylene (l-PP) has a melting point of at least 140° C., more preferably of at least 150° C., still more preferably of at least 160° C. and most preferably of at least 170° C.

Furthermore, as mentioned above the linear polypropylene (l-PP) shows no or nearby no-branching structure. Due to the absence of branches the linear polypropylene (l-PP) is preferably featured by a low $v_{30}$ melt extensibility and/or a low $F_{30}$ melt strength.

Thus it is preferred that the linear polypropylene (l-PP) has a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

Accordingly, in one specific embodiment the linear polypropylene (l-PP) has
(a) a melt flow rate $MFR_2$ (230° C.) measured according to ISO 1133 in the range from 10.0 to 50.0 g/10 min, preferably in the range from 20.0 to 40.0 g/10 min, like in the range from 25.0 to 38.0 g/10 min, more preferably in the range from 28.0 to 38.0 g/10 min, still more preferably in the range from 30.0 to 38.0 g/10 min, yet more preferably in the range from 32.0 to 38.0 g/10 min; and
(b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

Therefore, in one specific embodiment the linear polypropylene (l-PP) has a melt flow rate $MFR_2$ (230° C.) in the range from 10.0 to 50.0 g/10 min and a $v_{30}$ melt extensibility of below 200 mm/s, preferably a melt flow rate $MFR_2$ (230° C.) in the range from 20.0 to 40.0 g/10 min and a $v_{30}$ melt extensibility of below 190 mm/s, more preferably a melt flow rate $MFR_2$ (230° C.) like in the range from 25.0 to 38.0 g/10 min and a $v_{30}$ melt extensibility in the range of 100 to below 200 mm/s, yet more preferably a melt flow rate $MFR_2$ (230° C.) in the range from 28.0 to 38.0 g/10 min and in the range of 120 to 190 mm/s, still yet more preferably a melt flow rate $MFR_2$ (230° C.) in the range from 30.0 to 38.0 g/10 min and in the range of 120 to 175 mm/s, like a melt flow rate $MFR_2$ (230° C.) in the range from 32.0 to 38.0 g/10 min and a $v_{30}$ melt extensibility in the range of 125 to 170 mm/s.

In one embodiment of the present invention, the linear polypropylene (l-PP) has a $F_{30}$ melt strength of more than 1.0 cN, preferably of more than 2.0 cN, more preferably in the range of 1.0 to 65 cN, still more preferably in the range of 1.5 to 50 cN, yet more preferably in the range of 2.0 to 50 cN, still yet more preferably in the range of 2.5 to 50 cN like in the range of 2.5 to 30 cN.

The linear polypropylene (l-PP) can be produced in a known manner for instance by employing a single-site or a Ziegler Natta catalyst. The linear polypropylene (l-PP) can be a propylene homopolymer (H-PP), preferably a linear propylene homopolymer (1-H-PP), or a propylene copolymer (R-PP), preferably a linear propylene copolymer (1-R-PP). Concerning the comonomer content and type of comonomer it is referred to the information provided above for the branched polypropylene (b-PP) especially it is referred to the high melt strength random propylene copolymer (R-HMS-PP). Preferably, the linear polypropylene (l-PP) is a linear propylene homopolymer (1-H-PP). Accordingly all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer (1-H-PP).

In a specific embodiment the polypropylene (PP), preferably the linear polypropylene (1-PP'), and the linear polypropylene (l-PP) are linear propylene homopolymers, i.e. a linear propylene homopolymer (1-H-PP) and a linear propylene homopolymer (1-H-PP'). It is preferred that the linear propylene homopolymers, i.e. the linear propylene homopolymer (1-H-PP) and the linear propylene homopolymer (1-H-PP'), have differing properties, in particular in view of the melt flow rate $MFR_2$ (230° C.).

As mentioned above the linear polypropylene (l-PP) is used as a carrier to introduce the optional at least one additive (A) in the polypropylene composition. In other words an additive mixture (AM) comprising, preferably consisting of, the linear polypropylene (l-PP) and the at least one additive (A) is used in the instant process for the manufacture of the polypropylene composition.

It is thus preferred that the linear polypropylene (l-PP) comprises at least one additive (A). For example, the linear polypropylene (l-PP) comprises two or three additives (A), like two additives (A).

The at least one additives (A) can be any additive useful in the technical area of the high melt strength polypropylene (HMS-PP) and its applications.

For example, the at least one additives (A) to be used in the linear polypropylene (l-PP) and thus in form of the additive mixture (AM) include, but are not limited to, stabilizers such as antioxidants (e.g. sterically hindered phenols, phosphites/phosphonites, sulphur containing antioxidants, alkyl radikal scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers (e.g. Ca-stearate), blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), as well as slip and antiblocking agents (e.g. erucamide, oleamide, talc natural silica and synthetic silica, or zeolites). Preferably, the at least one additive (A) is selected from the group consisting of antioxidants (e.g. sterically hindered phenols, phosphites/phosphonites, sulphur containing antioxidants, alkyl radikyl scavengers, aromatic amines, hindered amine stabilizers, or blends thereof), metal deactivators (e.g. Irganox MD 1024), or UV stabilizers (e.g. hindered amine light stabilizers), antistatic or antifogging agents (e.g. ethoxylated amines and amides, or glycerol esters), acid scavengers (e.g. Ca-stearate), blowing agents, cling agents (e.g. polyisobutene), lubriciants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), slip agents, antiblocking agents (e.g. erucamide, oleamide, talc natural silica and synthetic silica, or zeolites) and mixtures thereof.

Typically the total amount of the at least one additive (A) in the additive mixture (AM) is not more than 25.0 wt.-%, more preferably not more than 20.0 wt.-%, like in the range of 5.0 to 20.0 wt.-% based on the total weight of the additive mixture (AM). For example, the total amount of the at least one additive (A) in the additive mixture (AM) is in the range of 10.0 to 20.0 wt.-% based on the total weight of the additive mixture (AM).

According to steps e) and f) of the instant process the polypropylene (PP), preferably the linear polypropylene (l-PP'), of step a) is reacted with the thermally decomposing free radical-forming agent of step b) and the bifunctionally unsaturated monomer(s) and/or with multifunctionally unsaturated low molecular weight polymer(s) of step c) obtaining thereby the branched polypropylene (b-PP) and, further, said branched polypropylene (b-PP) is reacted with the linear polypropylene (l-PP) of step d).

One essential aspect of the present invention is that the preparation of the instant polypropylene composition comprising the branched polypropylene (b-PP), i.e. the high melt strength polypropylene (HMS-PP), is carried out by using a polypropylene (PP), preferably the linear polypropylene (l-PP'), having a melt flow rate $MFR_2$ (230° C.) of more than 1.0 g/10 min, a thermally decomposing free radical-forming agent, bifunctionally unsaturated monomer(s) and/or with multifunctionally unsaturated low molecular weight polymer(s) and a linear polypropylene (l-PP) having a melt flow rate $MFR_2$ (230° C.) of 10.0 to 50.0 g/10 min.

Accordingly, the present invention relates to a process for providing a polypropylene composition comprising the branched polypropylene (b-PP), wherein the process comprises step e) in which the polypropylene (PP), preferably the linear polypropylene (l-PP'), of step a) is reacted with the thermally decomposing free radical-forming agent of step b) and the bifunctionally unsaturated monomer(s) and/or with multifunctionally unsaturated low molecular weight polymer(s) of step c) obtaining thereby the branched polypropylene (b-PP). The process further comprises step f) in which the branched polypropylene (b-PP) obtained in step e) is reacted with the linear polypropylene (l-PP) of step d) obtaining thereby the polypropylene composition. Concerning the definitions and preferred embodiments of the branched polypropylene (b-PP), the polypropylene (PP), preferably the linear polypropylene (l-PP'), the thermally decomposing free radical-forming agent, the bifunctionally unsaturated monomer(s) and/or multifunctionally unsaturated low molecular weight polymer(s) and the linear polypropylene (l-PP), reference is made to the information provided above.

Preferably the instant process is a single step process, i.e. no further process steps are required subsequent to process steps e) and f). In other words, the instant process allows obtaining a polypropylene composition comprising a branched polypropylene (b-PP) having a melt flow rate $MFR_2$ (230° C.) measured according to ISO 1133 in the range from 18.0 to 35.0 g/10 min without implementing a subsequent vis-breaking step.

As mentioned above, in step e) the branched polypropylene (b-PP), i.e. the high melt strength polypropylene (HMS-PP), is obtained by treating the polypropylene (PP), preferably the linear polypropylene (l-PP'), with thermally decomposing radical-forming agents.

However in such a case a high risk exists that the polypropylene (PP), preferably the linear polypropylene (l-PP'), is degraded, which is detrimental. Thus, it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the branched polypropylene (b-PP), i.e. the high melt strength polypropylene (HMS-PP), is for instance disclosed in EP 0 787 750, EP 0 879 830 A1 and EP 0 890 612 A2. All documents are herewith included by reference. Thereby, the amount of thermally decomposing radical-forming agents, preferably of peroxide, is preferably in the range of 0.05 to 3.00 wt.-% based on the amount of the polypropylene (PP), preferably the linear polypropylene (l-PP'). Typically, the thermally decomposing radical-forming agents are added together with the bifunctionally unsaturated monomer(s) and/or with multifunctionally unsaturated low molecular weight polymer(s) to the polypropylene (PP), preferably to the linear polypropylene (l-PP').

However it is also possible, but less preferred, that first the bifunctionally unsaturated monomer(s) and/or multifunctionally unsaturated low molecular weight polymer(s) is/are added to the polypropylene (PP), preferably to the linear polypropylene (l-PP'), and subsequent the thermally decomposing radical-forming agents, or the other way round, first the thermally decomposing radical-forming agents are added to the polypropylene (PP), preferably to the linear polypropylene (l-PP'), and subsequent the bifunctionally unsaturated monomer(s) and/or multifunctionally unsaturated low molecular weight polymer(s).

Preferably step f) is initiated when at least 70%, preferably at least 80%, yet more preferably at least 90%, like at least 95 or 99%, of the reaction between the polypropylene (PP), preferably the linear polypropylene (l-PP'), and the thermally decomposing free radical-forming agent and the bifunctionally unsaturated monomer(s) and/or multifunctionally unsaturated low molecular weight polymer(s) has taken place to obtain the branched polypropylene (b-PP), i.e. the high melt strength polypropylene (HMS-PP).

In a preferred embodiment, an extruder, such as a twin screw extruder, is used for steps e) and f).

The use of an extruder is particularly advantageous in that it can simultaneously be used for the preparation of the branched polypropylene (b-PP), i.e. the high melt strength polypropylene (HMS-PP), and for adding the linear polypropylene (l-PP) or for adding the additive mixture (AM) to said branched polypropylene (b-PP). In a preferred embodiment, the polypropylene (PP), preferably the linear polypropylene (l-PP'), is added to an extruder together with—as described in detail above—the thermally decomposing free radical-forming agent, preferably a peroxide, and the bifunctionally unsaturated monomer(s) and/or the multifunctionally unsaturated low molecular weight polymer(s), preferably with bifunctionally unsaturated monomer(s) selected from divinyl compounds, allyl compounds or dienes, to provide the branched polypropylene (b-PP), i.e. the high melt strength polypropylene (HMS-PP), in step e). It is also possible to use a combination of an extruder downstream a pre-mixing device, wherein the bifunctionally unsaturated monomer(s) and/or multifunctionally unsaturated low molecular weight polymer(s) and the thermally decomposing free radical-forming agent are added to the polypropylene (PP), preferably the linear polypropylene (l-PP'), in the pre-mixing device. Subsequently, in a step f) the linear polypropylene (l-PP) or the additive mixture (AM) based on said linear polypropylene (l-PP) comprising the at least one additive (A) is preferably added at the downstream end of the extruder screw in order not to interfere with the modification reaction for providing branched polypropylene (b-PP), i.e. the high melt strength polypropylene (HMS-PP), as described above. In this respect, the term "downstream end of the extruder screw" is understood as within the last 60% of the length of the extruder screw, preferably within the last 65% of the length of the extruder screw, more preferably at least 70% of the length of the extruder screw, like at least 75% of the extruder screw.

The extruder (E) used for the instant process preferably comprises in operation direction a first mixing zone (MZ1) and a second mixing zone (MZ2). For example, the extruder (E) used for the instant process preferably comprises a feed-throat (FT), a first mixing zone (MZ1), a second mixing zone (MZ2) and a die (D), wherein between the first mixing zone (MZ1) and the second mixing zone (MZ2) a side feed-throat (SFT) is located. It is preferred that reacting step e) takes place in the first mixing zone (MZ1) whereas reacting step f) takes place in the second mixing zone (MZ2) of the extruder.

It is further preferred that not more than 10.0 wt.-% of the total amount of the branched polypropylene (b-PP) of the polypropylene composition is produced in the second mixing zone (MZ2).

Preferably, the extruder is a screw extruder, like a twin screw extruder. Accordingly the polypropylene (PP), preferably the linear polypropylene (l-PP'), the thermally decomposing free radical-forming agent, preferably a peroxide, and the bifunctionally unsaturated monomer(s) and/or multifunctionally unsaturated low molecular weight polymer monomer(s), preferably selected from divinyl compounds, allyl compounds or dienes, but not the linear polypropylene (l-PP), and not the additives (A), are fed via the feed-throat (FT), thereby preferably using a feeder, into the extruder and is/are subsequently passed downstream through the first mixing zone (MZ1).

Preferably the shear stress in said first mixing zone (MZ1) is of such extent that the polypropylene (PP), preferably the linear polypropylene (l-PP'), is molten and the chemical reaction with the thermally decomposing free radical-forming agent and the bifunctionally unsaturated monomer(s) and/or multifunctionally unsaturated low molecular weight polymer(s) is initiated. After the first mixing zone (MZ1), i.e. between the first mixing zone (MZ1) and the second mixing zone (MZ2), the linear polypropylene (l-PP), or the additive mixture (AM) is added, i.e. fed into the extruder. Preferably, the linear polypropylene (l-PP), or the additive mixture (AM) is added via the side feed-throat (SFT), thereby preferably using a side feeder. Subsequently, all components of the polypropylene composition, including the linear polypropylene (l-PP), or the additive mixture (AM) are passed downstream through the second mixing zone (MZ2). Finally the polypropylene composition comprising the branched polypropylene (b-PP) is discharged via the die (D).

Preferably, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

It is preferred that 1.0 to 6.0 parts by weight of the linear polypropylene (l-PP) are added to 94.0 to 99.0 parts by weight of branched polypropylene (b-PP), based on the total weight of the polypropylene composition. In one embodiment of the present invention, 1.0 to 3.0 parts by weight of the linear polypropylene (l-PP) are added to 97.0 to 99.0 parts by weight of branched polypropylene (b-PP), based on the total weight of the polypropylene composition. For example, 2.0 parts by weight of the linear polypropylene (l-PP) are added to 98.0 parts by weight of branched polypropylene (b-PP), based on the total weight of the polypropylene composition.

As mentioned above due to the instant process a polypropylene composition is obtained which comprises a branched polypropylene (b-PP), i.e. a high melt strength polypropylene (HMS-PP). In a preferred embodiment, the instant polypropylene composition comprises, preferably consists of, a branched polypropylene (b-PP), i.e. a high melt strength polypropylene (HMS-PP), a polypropylene (PP), preferably a linear polypropylene (l-PP'), a linear polypropylene (l-PP) and optionally at least one additive (A).

The major component in the instant polypropylene composition is the branched polypropylene (b-PP), i.e. the high melt strength polypropylene (HMS-PP). Accordingly the polypropylene composition comprises at least 70 wt.-%, more preferably at least 75 wt.-%, yet more preferably at least 80 wt.-%, still more preferably at least 85 wt.-%, still yet more preferably at least 90 wt.-%, like at least 95 wt.-%, of the branched polypropylene (b-PP), i.e. the high melt strength polypropylene (HMS-PP), based on the total weight of the polypropylene composition.

In one embodiment of the present invention, the instant polypropylene composition comprises
(a) 80.0 to 99.0 parts by weight, preferably 90.0 to 99.0 parts by weight, more preferably 95.0 to 99.0 parts by weight, of the branched polypropylene (b-PP), preferably of the high melt strength polypropylene (HMS-PP); and
(b) 1.0 to 20.0 parts by weight, preferably 1.0 to 10.0 parts by weight, more preferably 1.0 to 5.0 parts by weight, of the linear polypropylene (l-PP), based on the total weight of the polypropylene composition.

In a preferred embodiment the branched polypropylene (b-PP), i.e. the high melt strength polypropylene (HMS-PP), and the linear polypropylene (l-PP), are the only polymer components in the polypropylene composition. In other words the polypropylene composition may comprise further at least one additive (A) as defined in more detail above but no other polymers in an amount exceeding 5.0 wt.-%, more preferably exceeding 2.0 wt.-%, still more preferably exceeding 1.0 wt.-%, based on the total weight of the polypropylene composition. In a specific embodiment of the present invention, the polypropylene composition consists of the branched polypropylene (b-PP), i.e. the high melt strength polypropylene (HMS-PP), the linear polypropylene (l-PP), and at least one additive (A).

Preferably the total amount of additives (A) in the polypropylene composition is not more than 5.0 wt.-%, more preferably not more than 1.0 wt.-%, like in the range of 0.005 to 0.5 wt.-%, based on the total weight of the polypropylene composition.

Therefore, the present process is directed to the manufacture of a polypropylene composition comprising
(a) 80.0 to 99.0 parts by weight, preferably 90.0 to 99.0 parts by weight, more preferably 95.0 to 99.0 parts by weight, of the branched polypropylene (b-PP), i.e. of the high melt strength polypropylene (HMS-PP);
(b) 1.0 to 20.0 parts by weight, preferably 1.0 to 10.0 parts by weight, more preferably 1.0 to 5.0 parts by weight, of the linear polypropylene (l-PP), having a melt flow rate $MFR_2$ (230° C.) measured according to ISO 1133 in the range from 10.0 to 50.0 g/10 min, preferably in the range from 20.0 to 40.0 g/10 min, more preferably in the range from 25.0 to 38.0 g/10 min, yet more preferably in the range from 28.0 to 38.0 g/10 min, like in the range from 30.0 to 38.0 g/10 min or in the range from 32.0 to 38.0 g/10 min; and
(c) optionally 0.005 to 5.0, preferably 0.005 to 2.0, more preferably 0.05 to 1.0, like 0.05 to 0.5, parts by weight of at least one additive (A), preferable two additives (A), wherein said at least one additive (A) is preferably selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

As mentioned above, the branched polypropylene (b-PP), i.e the high melt strength polypropylene (HMS-PP), is the dominant part in the instant polypropylene composition. Accordingly it is preferred that the final polypropylene composition shows a similar rheology behavior as the branched polypropylene (b-PP), i.e. the high melt strength polypropylene (HMS-PP).

Thus, the instant polypropylene composition preferably has a $F_{30}$ melt strength of more than 3.4 cN and a $v_{30}$ melt extensibility of more than 200 mm/s, more preferably a $F_{30}$ melt strength from 4.0 to 20.0 cN and a $v_{30}$ melt extensibility from 240 to 300 mm/s and most preferably a $F_{30}$ melt strength from 4.0 to 10.0 cN and a $v_{30}$ melt extensibility from 240 to 300 mm/s, wherein the $F_{30}$ melt strength and the $v_{30}$ melt extensibility are measured according to ISO 16790: 2005, Additonally or alternatively, the instant polypropylene composition preferably has a melt flow rate $MFR_2$ (230° C.) measured according to ISO 1133 of 18.0 to 35.0 g/10 min, more preferably from 19.0 to 30.0 g/10 min and most preferably from 19.0 to 25.0 g/10 min Additonally or alternatively, the instant polypropylene composition preferably has an OCS gel index of less than 2,500, preferably of less than 2,000 and most preferably from 500 to 2,000.

Hence, in one specific embodiment of the present invention, the instant polypropylene composition preferably has
a) a $F_{30}$ melt strength of more than 3.4 cN and a $v_{30}$ melt extensibility of more than 200 mm/s, preferably a $F_{30}$ melt strength from 4.0 to 20.0 cN and a $v_{30}$ melt extensibility from 240 to 300 mm/s and most preferably a $F_{30}$ melt strength from 4.0 to 10.0 cN and a $v_{30}$ melt extensibility from 240 to 300 mm/s, wherein the $F_{30}$ melt strength and the $v_{30}$ melt extensibility are measured according to ISO 16790:2005, and
b) a melt flow rate $MFR_2$ (230° C.) measured according to ISO 1133 of 18.0 to 35.0 g/10 min, preferably from 19.0 to 30.0 g/10 min and most preferably from 19.0 to 25.0 g/10 min, and
c) an OCS gel index of less than 2,500, preferably of less than 2,000 and most preferably from 500 to 2,000.

One essential finding of the present invention is that the instant polypropylene composition and thus films made from said polypropylene composition (especially as defined below) show a reduced OCS gel index. Accordingly it is preferred that the instant polypropylene composition has an OCS gel index of less than 2,500, preferably of less than 2,000 and most preferably from 500 to 2,000.

Keeping the information provided above in mind the present invention covers a polypropylene composition comprising
(a) 95.0 to 99.0 parts by weight of a branched polypropylene (b-PP); and
(b) 1.0 to 5.0 parts by weight of a linear polypropylene (l-PP) having a melt flow rate $MFR_2$ (230° C.) measured according to ISO 1133 of 10.0 to 50.0 g/10 min, preferably from 20.0 to 40.0 g/10 min;
wherein the polypropylene composition has
a melt flow rate $MFR_2$ (230° C.) measured according to ISO 1133 from 18.0 to 35.0 g/10 min, and
an OCS gel index of less than 2,500; and
wherein the polypropylene composition and/or the branched polypropylene (b-PP) has/have a $F_{30}$ melt strength of more than 3.4 cN and a $v_{30}$ melt extensibility of more than 200 mm/s, wherein the $F_{30}$ melt strength and the $v_{30}$ melt extensibility are measured according to ISO 16790:2005.

For example, the polypropylene composition comprises
(a) 95.0 to 99.0 parts by weight of a branched polypropylene (b-PP); and
(b) 1.0 to 5.0 parts by weight of a linear polypropylene (l-PP) having a melt flow rate $MFR_2$ (230° C.) measured according to ISO 1133 from 25.0 to 38.0 g/10 min;

wherein the polypropylene composition has
a melt flow rate $MFR_2$ (230° C.) measured according to ISO 1133 from 19.0 to 25.0 g/10 min, and
an OCS gel index of less than 2,000;
and wherein further the polypropylene composition and/or the branched polypropylene (b-PP) has/have a $F_{30}$ melt strength from 4.0 to 20.0 cN and a $v_{30}$ melt extensibility from 240 to 300 mm/s, wherein the $F_{30}$ melt strength and the $v_{30}$ melt extensibility are measured according to ISO 16790:2005.

As mentioned above, the present invention also features a film comprising the instant polypropylene composition described herein. Preferably the film is a cast film or a blown film. The film may also be a biaxially oriented film, like biaxially oriented blown film. The differences between such films are known to the skilled person. Reference is made in this regard to the "Polypropylene Handbook", pages 405 to 414, $2^{nd}$ Edition, Nello Pasquini (Ed.), Hanser. Preferably the film comprises at least 70 wt.-%, more preferably at least 80 wt.-%, more preferably at least 90 wt.-%, yet more preferably at least 95 wt.-%, of the polypropylene composition according to the instant invention. In a preferred embodiment the film consists of the instant polypropylene composition.

The preparation of the films is accomplished by methods known in the art. For instance, the film can be produced by cast film or blown film technology. In the cast film technology the molten polypropylene composition is extruded through a slot extrusion die onto a chill roll to cool the polymer to a solid film. Typically the polypropylene composition is firstly compressed and liquefied in an extruder, it being possible for any additives to be already added to the polymer or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 10 to 40° C., more preferably from 12 to 35° C. The obtained product is an unstretched film which can if desired biaxially stretched.

In the blown film process the polypropylene composition is extruded through an annular die and blown into a tubular film by forming a bubble which is collapsed between nip rollers after solidification. The blown extrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

In the following, the present invention is described in more detail by way of examples.

EXAMPLES

A. Measuring methods

The following definitions of terms and determination methods apply for the above general description of the invention as well as to the below examples unless otherwise defined.

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step $MFR_2$ (230° C.) is measured according to ISO 1133 (230° C., 2.16 kg load).

$F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Gottfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 $mm/sec^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

OCS Gel Index

1. Apparatus

The apparatus consists of a laboratory extruder ME 25/5200 V1 with three heating zones, an adapter and a 150 mm broad die. The follow-on unit encompasses a chillroll CR-8, diameter 140 mm, including Haake C40P heating- and cooling device (15 to 90° C.), a line scan camera FS-5/4096 Pixel (dynamical digital converting of gray scale images) and a wind-up unit with automatic tension control up to 10 N.

2. Material-Specific Settings for Film-Manufacturing

The temperature setting for the heating zones at cylinder and die is classified for polypropylene according to MFR-ranges in three groups:

Group 1: MFR-range 0.3-2.0 g/10 min (230° C./2.16 kg), temperatures 220/260/270/280/290° C.
Group 2: MFR-range 2.0-10 g/10 min (230° C./2.16 kg), temperatures 220/230/240/250/260° C.
Group 3: MFR-range 10-33 g/10 min (230° C./2.16 kg), temperatures 200/220/230/240/240° C.

Preset Parameters:
Rotational speed (screw): 30 rpm
Haul-off speed: 3 m/min;
The film thickness is 50 μm 3. Measurement After fulfilment of the following parameters: In case of similar materials ca. 60 min running-in period, in case of highly diverging materials ca. 120 min.

Goal: Adjustment of a homogenous film at constant melt pressure and melt temperature. The measuring area is standardised at 5 m². The measurement itself is terminated automatically when the area is accomplished. The report will be printed simultaneously.

4. Analysis

The number of found defects is, referring 1/m², class-divided according to size and multiplied with the mass factor, adding up to the gelindex.

| Size class 1 | 100-300 μm | mass factor × 0.1 |
| Size class 2 | 301-600 μm | mass factor × 1.0 |
| Size class 3 | 601-1000 μm | mass factor × 5.0 |
| Size class 4 | >1000 μm | mass factor × 10 |

Example:

| 17 defects | size class 1 | ×0.1 = 1.7 |
| 5 defects | size class 2 | × 1.0 = 5.0 |
| 2 defects | size class 3 | × 5.0 = 10.0 |
| 0 defects | size class 4 | × 10.0 = 0 | gelindex = 16.7

B. Examples

Linear Polypropylenes (l-PP)

l-PP1 is a linear propylene homopolymer having a MFR$_2$ (230° C.) of 3.48 g/10 min, a melting temperature Tm of 160° C., a F$_{30}$ melt strength of 6.5 cN and v$_{30}$ melt extensibility 160 mm/s.

l-PP2 is a linear propylene homopolymer having a MFR$_2$ (230° C.) of 35 g/10 min, a melting temperature Tm of 210-250° C. and v$_{30}$ melt extensibility 160 mm/s.

Additive Mixtures

The linear polypropylene l-PP2 was used to provide an additive mixture containing further additives as a masterbatch for incorporating into a base polymer of branched polypropylene.

The additive mixture contains 87.50 wt.-% of the respective linear polypropylene l-PP2, 10.00 wt.-% Irganox B 225 FF (antioxidant), and 2.50 wt.-% Hydrotalcit, based on the total weight of the additive mixture.

Inventive Examples IE1 to IE 4 and Comparative Example CE1 l-PP1 was subjected to a reactive extrusion in the presence of butadiene and peroxide as described in the following.

Both the butadiene and the peroxide (amounts are indicated in table 1) were pre-mixed with the l-PP1 powder prior to the melt-mixing step in a horizontal mixer with paddle stirrer at a temperature of 65° C., maintaining an average residence time of 15 to 20 minutes. The pre-mixture was transferred under inert atmosphere to a co-rotating twin screw extruder of the type Theyson TSK60 having a barrel diameter of 60 mm and an L/D-ratio of 48 equipped with a high intensity mixing screw having 3 kneading zones and a two-step degassing setup. The temperature in the extruder was set to 240° C. The screw speed and throughput is indicated in table 1. In the first ¾ of the extruder length the branched polypropylene is produced (b-PP). Subsequently, via a side feeder, i.e. at the last ¼ of the extruder length, the additive mixture as defined above is fed into the extruder to the produced branched polypropylene (b-PP). The extruded polypropylene composition was discharged and pelletized. From the pellets films have been produced as described above (OCS gel index). The properties of the pelletized polypropylene composition as well as of the films are indicated in table 2.

TABLE 1

Process conditions

| | | IE 1 | IE 2 | IE 3 | IE 4 |
|---|---|---|---|---|---|
| Peroxide* | [wt.-%] | 0.45 | 0.53 | 0.60 | 0.68 |
| butadiene* | [l/h] | 130 | 80 | 65 | 65 |
| screw speed | [rpm] | 400 | 400 | 400 | 400 |
| throughput | [kg/h] | 200 | 200 | 200 | 200 |
| additive mixture* | [wt.-%] | 2 | 2 | 2 | 2 |

*based on the total weight of the polypropylene composition

TABLE 2

Properties of polypropylene composition and films

| | MFR$_2$ [g/10 min] | F$_{30}$ [cN] | STD F$_{30}$ | v$_{30}$ [mm/s] | STD v$_{30}$ | OCS gel index [—] |
|---|---|---|---|---|---|---|
| IE1 | 21.1 | 8.10 | 0.1 | 282 | 8 | 1980 |
| IE2 | 19.7 | 8.20 | 0.1 | 273 | 4 | 744 |
| IE3 | 22 | 4.50 | 0.1 | 287 | 11 | 745 |
| IE4 | 32.2 | 3.50 | 0.1 | 292 | 10 | 590 |
| CE1 | 21.7 | 3.40 | 0.1 | 255 | 10 | 12434 |

A suitable polypropylene composition having a melt flow rate MFR$_2$ (230° C.) measured according to ISO 1133 of 18.0 to 35.0 g/10 min can be prepared in a single step process by incorporating a linear polypropylene into a branched polypropylene, i.e. without implementing a further vis-breaking step subsequent to the instant process. At the same time, it can be gathered that the resulting polypropylene composition exhibits higher melt strength F$_{30}$ as well as higher melt extensibility v$_{30}$ compared to the reference material CE1 (commercially available as WF420HMS from Borealis AG, Austria). In addition thereto, the resulting polypropylene composition shows a higher film quality expressed by lower values for the OCS gel index compared to the reference material CE1.

What is claimed is:
1. A process for providing a polypropylene composition comprising a branched polypropylene (b-PP), the process comprising the steps of:
 a) providing a linear polypropylene (l-PP') having a melt flow rate MFR$_2$ (230° C.) in the range of 3.0 to 18 g/10min, a $F_{30}$ melt strength in the range of 6.5 to 65 cN, and a $v_{30}$ melt extensibility in the range of 125 to 190 mm/s, wherein the $F_{30}$ melt strength and the $v_{30}$ melt extensibility are measured according to ISO 16790:2005;
b) providing a thermally decomposing free radical-forming agent,
c) providing bifunctionally unsaturated monomer(s) and/or multifunctionally unsaturated low molecular weight polymer(s),
d) providing a linear polypropylene homopolymer (I-PP) having a melt flow rate $MFR_2$ (230° C.) of 20.0 to 40.0 g/10min,
e) reacting the linear polypropylene (I-PP') of step a) with the thermally decomposing free radical-forming agent of step b) and the bifunctionally unsaturated monomer(s) and/or multifunctionally unsaturated low molecular weight polymer(s) of step c) obtaining thereby the branched polypropylene (b-PP), and
f) reacting the branched polypropylene (b-PP) obtained in the step e) with the linear polypropylene homopolymer (I-PP) of the step d),
wherein the polypropylene composition has
i) a melt flow rate $MFR_2$ (230° C.) measured according to ISO 1133 of 18.0 to 35.0 g/10min, and
ii) a $F_{30}$ melt strength of more than 4-20 cN and a $v_{30}$ melt extensibility of 240-300 mm/s, wherein the $F_{30}$ melt strength and the $v_{30}$ melt extensibility are measured according to ISO 16790:2005,
wherein the branched polypropylene (b-PP) is present in the polypropylene composition in an amount of 80.0 to 99.0 parts by weight, based on the total weight of the polypropylene composition, and
wherein the steps e) and f) of the process are conducted in one extruder without a subsequent vis-breaking step.

2. The process according to claim 1, wherein
(a) the thermally decomposing free radical-forming agent of saki step b) is a peroxide,
and/or
(b) the bifunctionally unsaturated monomer(s) and/or multifunctionally unsaturated low molecular weight polymer(s) of said step c) is/are selected from the group consisting of divinyl compounds, allyl compounds and dienes.

3. The process according to claim 1, wherein
(a) the linear polypropylene homopolymer (l-PP) of said step d) comprises at least one additive (A) selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof, and
(b) the branched polypropylene (b-PP) obtained in said step e) is free of additives (A).

4. The process according to claim 1, wherein said extruder comprises in operation direction a first mixing zone (MZ1) and a second mixing zone (MZ2), wherein further said step e) takes place in the first mixing zone (MZ1), whereas said step f) takes place in the second mixing zone (MZ2).

5. The process according to claim 4, wherein the extruder comprises in operation direction a feed-throat (FT), the first mixing zone (MZ1), the second mixing zone (MZ2) and a die (D), wherein between the first mixing zone (MZ1) and the second mixing zone (MZ2) a side feed-throat (SFT) is located, wherein further the linear polypropylene (l-PP') of said step a), the thermally decomposing free radical-forming agent of said step b), and the bifunctionally unsaturated monomer(s) and/or multifunctionally unsaturated low molecular weight polymer(s) of said step c) are fed via the feed-throat (FT) and the linear polypropylene homopolymer (I-PP) of said step d) is fed via the side feed-throat (SFT).

6. The process according to claim 4, wherein not more than 10.0 wt.-% of the total amount of the branched polypropylene (b-PP) of the polypropylene composition is produced in the second mixing zone (MZ2).

7. The process according to claim 1, wherein 1.0 to 6.0 parts by weight of the linear polypropylene homopolymer (I-PP) are added to 94.0 to 99.0 parts by weight of said branched polypropylene (b-PP).

8. The process according to claim 1, wherein the resulting polypropylene composition
(a) has said melt flow rate $MFR_2$ (230° C.) measured according to ISO 1133 of 19.0 to 30.0 g/10min, and
(b) has an OCS gel index of less than 2,500.

9. The process according to claim 1, wherein the resulting polypropylene composition has
(a) 95.0 to 99.0 parts by weight of the branched polypropylene (b-PP); and
(b) 1.0 to 5.0 parts by weight of the linear polypropylene homopolymer (I-PP);
wherein the polypropylene composition has
an OCS gel index of less than 2,500.

10. The process according to claim 1, wherein the linear polypropylene (I-PP') has a melt flow rate $MFR_2$ (230° C.) measured according to ISO in the range from 3.0 to 15.0 g/10min.

11. The process according to claim 1, wherein
(a) the linear polypropylene homopolymer (I-PP) of said step d) has a melt flow rate $MFR_2$ (230° C.) measured according to ISO 1133 from 25.0 to 38.0 g/10min, and
(b) the linear polypropylene homopolymer (I-PP) of said step d) comprises two additives (A) selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof, and
(c) the branched polypropylene (b-PP) obtained in said step e) is free of the additives (A).

12. The process according to claim 1, wherein 1.0 to 3.0 parts by weight of the linear polypropylene homopolymer (I-PP) are added to 97.0 to 99.0 parts by weight of said branched polypropylene (b-PP).

13. The process according to claim 1, wherein the resulting polypropylene composition
(a) has said melt flow rate $MFR_2$ (230° C.) measured according to ISO 1133 of 19.0 to 30.0 g/10min, and
(b) has an OCS gel index of less than 2,000.

14. The process according to claim 1, wherein the resulting polypropylene composition has
(a) 95.0 to 99.0 parts by weight of the branched polypropylene (b-PP); and
(b) 1.0 to 5.0 parts by weight of the linear polypropylene homopolymer (I-PP);
wherein the polypropylene composition has
a melt flow rate $MFR_2$ (230 ° C.) measured according to ISO 1133 from 19.0 to 30.0 g/10min, and
an OCS gel index of less than 2,500.

15. The polypropylene composition produced in accordance with claim 1 comprising:
(a) 95.0 to 99.0 parts by weight of the branched polypropylene (b-PP); and (b) 1.0 to 5.0 parts by weight of the linear polypropylene homopolymer (I-PP) having a melt flow rate $MFR_2$ (230 °C.) measured according to ISO 1133 of 20.0 to 40.0 g/10min;

wherein the polypropylene composition has an OCS gel index of less than 2,500.

16. The polypropylene composition according to claim 15, comprising
   (a) 95.0 to 99.0 parts by weight of said branched polypropylene homopolymer (b-PP); and
   (b) 1.0 to 5.0 parts by weight of said linear polypropylene (I-PP) having a melt flow rate $MFR_2$ (230 °C.) measured according to ISO 1133 from 25.0 to 38.0 g/10min;

wherein the polypropylene composition has said melt flow rate $MFR_2$ (230 °C.) measured according to ISO 1133 is from 19.0 to 25.0 g/10min, and said OCS gel index is less than 2,000.

17. The polypropylene composition according to claim 15, wherein the polypropylene composition comprises at least one additive (A) selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

18. A film comprising the polypropylene composition according to claim 15.

* * * * *